United States Patent [19]

Bridigum

[11] 4,026,609

[45] May 31, 1977

[54] PRESSURE REDUCTION AND PRESSURE REDUCTION RATE SENSITIVE EMERGENCY VENT VALVE

[75] Inventor: Robert J. Bridigum, Plum Borough, Pa.

[73] Assignee: Westinghouse Air Brake Company, Wilmerding, Pa.

[22] Filed: Aug. 26, 1976

[21] Appl. No.: 717,984

[52] U.S. Cl. ................................. 303/82; 303/57
[51] Int. Cl.² ........................................ B60T 15/44
[58] Field of Search ............ 303/57, 63, 69, 81–83, 303/86; 137/494

[56] References Cited

UNITED STATES PATENTS

| | | | |
|---|---|---|---|
| 2,861,587 | 11/1958 | Hursen | 303/82 X |
| 2,992,861 | 7/1961 | Hursen | 303/57 X |
| 3,165,115 | 1/1965 | Erson | 303/82 X |
| 3,175,871 | 3/1965 | Wilson | 303/82 |

Primary Examiner—Duane A. Reger
Attorney, Agent, or Firm—R. S. Visk; R. W. McIntire, Jr.

[57] ABSTRACT

A railway vehicle fluid pressure operable emergency vent valve responsive to a reduction of brake pipe pressure at a rate in excess of a certain rate, or at an emergency rate, for unrestrictedly venting the brake pipe to atmosphere and thus propagating an emergency brake application, but also sensitive and operable responsively to a reduction of brake pipe pressure, irrespective of rate or at a normally undetectable rate, to a value insufficient for effective brake control, for initiating an emergency brake application.

7 Claims, 1 Drawing Figure

U.S. Patent May 31, 1977 4,026,609
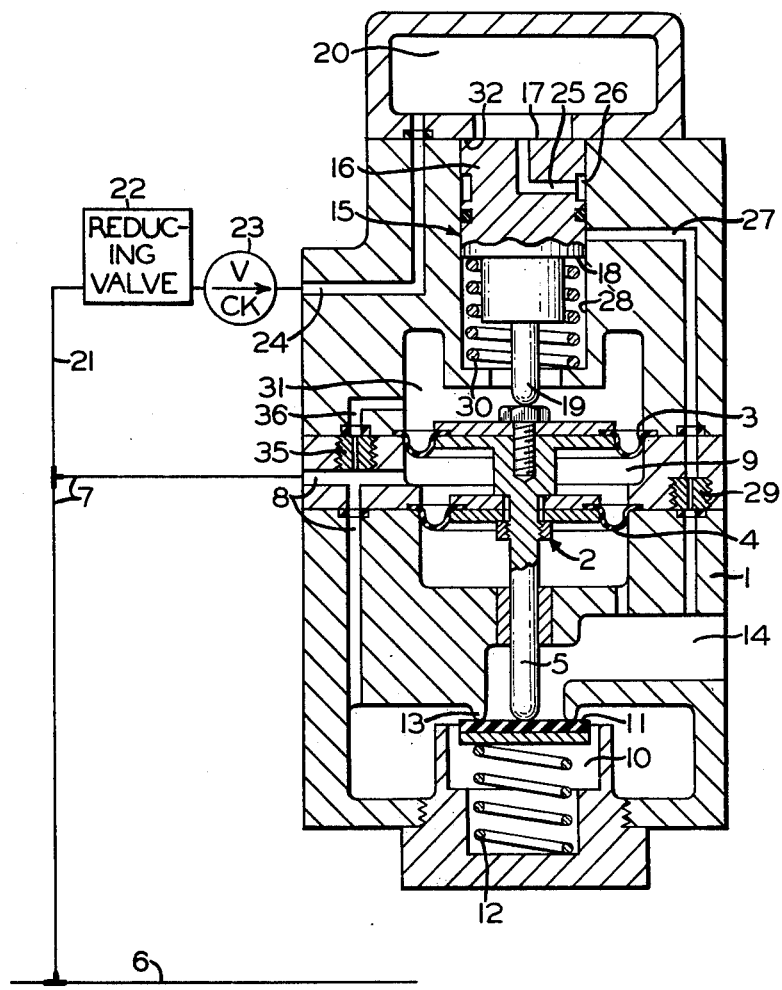

PRESSURE REDUCTION AND PRESSURE REDUCTION RATE SENSITIVE EMERGENCY VENT VALVE

BACKGROUND OF THE INVENTION

Conventionally, and particularly in mass transit braking equipment, an emergency brake application is initiated electrically, that is, the emergency vent valve devices on each of the cars making up a train, are actuated simultaneously by energization of a continuous electrical circuit running throughout the train. A piston in the emergency vent valve is subjected on opposite sides, through a choke, to brake pipe pressure so that when the pressure on one side of the piston is suddenly, or at an emerrgency rate, reduced by said electrical actuation, the differential created across the piston causes the piston to open the vent valve for unrestrictedly opening the brake pipe to atmosphere and thereby propogating an emergency brake application. This type of vent valve device is effective as long as brake pipe pressure on opposite sides of the piston is sufficient to provide a pressure differential thereacross when pressure on one side is released. It is possible, however, that pressure may leak from the brake pipe at such a slow rate as to go undetected until brake pipe pressure reaches such a low level as to be ineffective for establishing a pressure differential across the piston upon venting of pressure on one side thereof, thereby rendering the apparatus ineffective for an emergency brake application. Moreover, due to such slow and undetectable leakage, pressure in the brake pipe may reach a low pressure level below that at which any braking action, either service or emergency, could be effected.

SUMMARY OF THE INVENTION

The object of the invention is to provide an emergency vent valve device operable responsively to reduction of brake pipe pressure at an emergency rate or to inadvertent undetectable reduction of brake pipe pressure to a valve insufficient for normal braking operation, for initiating an emergency brake application in either case.

The invention comprises an emergency vent valve device including a differential piston subjected to brake pipe pressure unrestrictedly on one side and via a choke on the opposite side, so that a reduction of pressure on the one side at a rate in excess of a certain rate, or at an emergency rate, causes said piston, in response to a pressure differential thus established thereacross, to open a vent valve for effecting an emergency application. The emergency vent valve device also includes a piston valve subjected on one side to a reference pressure of a degree such than any lesser degree would be considered inadequate for safe brake control, and subjected on the opposite side to the same pressure acting on the opposite side of the differential piston, so that inadvertent reduction of brake pipe pressure acting on said opposite side of the piston valve to a value less than the preselected reference pressure and at a rate ineffective for causing actuating of the differential piston, causes said piston valve to actuate the piston for opening the vent valve for effecting an emergency brake application.

The single FIG. drawing shows an elevational view, in section, of an emergency vent valve device embodying the invention in a schematic arrangement thereof with a brake pipe.

DESCRIPTION AND OPERATION

An emergency vent valve device embodying the invention, as shown in the drawing, comprises a casing 1 in which a differential piston assemblage 2 is coaxially reciprocably disposed and includes a pair of axially spaced-apart diaphragm type pistons 3 and 4 peripherally secured between respective sections of said casing and coaxially on a piston stem 5, said piston 4 being of smaller diameter than piston 3.

A brake pipe 6 which extends throughout the length of the train but only a portion of which is shown, is connected via a connecting pipe 7 to a passageway 8 formed in casing 1, said passageway connecting to both an intermediate chamber 9 formed between pistons 3 and 4, and to a brake pipe pressure chamber 10 formed in casing 1, both said chambers, therefore, being communicated with each other. A disc type vent valve 11 operably disposed in pressure chamber 10 is normally urged by a spring 12, also disposed in said pressure chamber, toward a seated or closed postion relative to a valve seat 13 surrounding one end of an atmospheric passageway 14. When piston assemblage 2 is moved downwardly, as viewed in the drawing and in a manner to be hereinafter disclosed, to a vent position, vent valve 11 is abuttingly contacted by the free end of piston rod 5 and operated to an unseated or open position relative to valve seat 13 for communicating brake pipe pressure chamber 10, and therefore brake pipe 6 via pipe 7 and passageway 8, unrestrictedly to atmosphere via passageway 14.

The upper portion of casing 1, as viewed in the drawing, houses a piston valve assemblage 15 operably disposed in axial alignment with piston assemblage 2 and comprising a piston valve 16 having equal pressure areas 17 and 18 at respective opposite ends thereof. A valve stem 19 extends axially from the lower side, as viewed in the drawing, of piston valve 16, and is of such length as to be abuttingly engageable with but separable from the upper side of piston 3. Upper pressure area 17 is subjected to a reference pressure in a reference pressure chamber 20 formed adjacent thereto in casing 1. The reference pressure is provided in chamber 20 from brake pipe 6 via connecting pipe 7, a branch pipe 21, in which a reducing valve device 22 and a one-way check valve device 23 (the direction of flow indicated by the arrow) are serially interposed, and a supply passageway 24 formed in casing 1.

In rapid transit brake equipment of the type in which the emergency vent valve device herein disclosed is intended to be used, brake pipe 6 is normally charged at an operating pressure such as 110 psi., for example. When an emergency application is effected, brake pipe pressure, as is well known to those skilled in the art, is released completely at an emergency rate, whereas when a service application is effected, a lesser reduction occurs at a slower or service rate. The amount of brake pipe pressure for a service application, of course, depends on the degree of application desired, and, at the most, may be as much as 30 psi., for example, that is a reduction from 110 psi. to 80 psi. In order to insure the very minimum of safe braking control, brake pipe pressure should never be permitted to drop below 35 psi., for example. Accordingly, reducing valve device 22 is set to provide a reference pressure in chamber 20 at substantially 35 psi. for a purpose to be more fully explained hereinafter.

Piston valve 16 has a connecting passageway 25 formed therein with one end opening to reference chamber 20 and the other end opening to an annular groove 26 surrounding said piston valve between the opposite ends thereof. A vent passageway 27 formed in casing section 1 has one end opening to a bore 28 in which piston valve 16 is reciprocably operable, while the other end of said passageway connects with atmospheric passageway 14. A reset choke 29 of preselected flow capacity is interposed in vent passageway 27.

A relatively light spring 30 compressedly disposed in a control chamber 31 formed in casing 1 between lower pressure area 18 and the upper side of piston 3 opposite intermediate chamber 9, urges piston valve 16 upwardly toward an upper or cut-off position in which the end of vent passageway 27 opening into bore 28 is blocked off by said piston valve and out of registry with groove 26, said cut-off position being defined by abutment of the piston valve with a shoulder 32 formed in the casing. Control chamber 31 is charged with pressure from intermediate chamber 9 via a rate-sensitive choke 35 of preselected flow capacity interposed between passageway 8 and a charging passageway 36 formed in said casing and connecting said choke with said control chamber.

In operation, as is well known to those skilled in the art, a reduction of pressure in brake pipe 6, when initiated by the operator at the head end of the train, initiates either a service or an emergency brake application, depending upon the rate at which reduction of brake pipe pressure is effected. It is well known that brake pipe pressure reduction for effecting a service application occurs at a lesser rate than that required for an emergency application.

The flow rate capacity of rate-sensitive choke 35 is selected such that a brake pipe pressure reduction at a service rate, which is also reflected in passageway 8 and, therefore, in intermediate chamber 9 and brake pipe pressure chamber 10 for effecting a service brake application, can also be accommodated by said choke. That is, pressure in control chamber 31 may readily adjust via choke 35 to the service rate reduction of pressure in intermediate chamber 9 and brake pipe pressure chamber 10 for maintaining the opposing forces acting on larger piston 3 in a balanced state, or at least the upwardly directed forces predominant over the downwardly directed force acting thereon so that piston assemblage 2 is maintained in a neutral position in which vent valve 11 remains closed and, therefore, the emergency vent valve device remains unaffected. The opposing forces acting on piston 3 are generated downwardly by pressure in control chamber 31 and upwardly by spring 12 acting through valve 11 and stem 5 and the pressure in intermediate chamber 9 effective over the difference of the oppositely facing pressure areas of pistons 3 and 4.

If a brake pipe pressure reduction is effected at an emergency rate for an emergency application, the flow rate capacity of choke 35 is so restrictive as to cause a pressure differential between chambers 9 and 31, and therefore across piston 3, sufficient for overcoming the upwardly directed forces acting on said piston to cause downward movement of piston assemblage 2 to its vent position, above described. Pressure in brake pipe 6 is thus vented unrestrictedly to atmosphere at the lead car of the train, and since said brake pipe is connected from car to car, each vent valve device of each car is successively actuated to thereby propogate the emergency application throughout the train.

Incidental to brake pipe pressure reduction at an emergency rate attendant with an emergency application, pressure in control chamber 31 reduces at a controlled rate via choke 35 and eventually past open vent valve 11. When control pressure in control chamber 31 has dropped to a critical value at which reference pressure in reference chamber 20 is dominant over such reduced control pressure and the force of spring 30, piston valve 16 is moved downwardly to an exhaust position in which groove 26 registers with vent passageway 27 and in which reference pressure in chamber 20 exhausts to atmosphere at a controlled rate via reset choke 29 and atmospheric passageway 14. The time required to substantially deplete pressure in reference chamber 20 assures complete venting of pressure in brake pipe 6 before spring 30 is able to reset piston valve 16 to its cut-off position, above defined, in which said reference chamber is cut off from atmosphere and said brake pipe may be recharged.

If leakage of pressure in brake pipe 6 occurs at such a relatively slow rate as to go undetected, or at least, at a rate such that rate sensitive choke 35 readily accommodates pressure equalization between chambers 9 and 31, no differential is established across piston 3, and therefore piston assemblage 2 remains in its neutral position in which it is shown. If such slow leakage of brake pipe pressure continues, however, until pressure in chamber 31 drops below the above-mentioned critical value, piston valve 16 is forced downwardly by pressure in reference chamber 20 to engage and carry with it piston assemblage 2 to their respective exhaust and vent positions in which vent valve 11 is operated to its open position. With vent valve 11 open, brake pipe pressure is promptly and completely vented to atmosphere at an emergency rate for effecting an emergency brake application. Having effected an emergency brake application, the emergency vent valve device operates, as above described, in propogating the emergency application. When the leakage has been corrected, all respective pressures in the several chambers 9, 31, and 20 will be restored to normal levels.

From the above description, it should be evident that the emergency vent valve device herein disclosed is operative for effecting emergency venting of brake pipe 6 and, therefore, an emergency brake application in response to either a deliberately initiated emergency rate of brake pipe reduction or a reduction of brake pipe pressure below a critical value irrespective of rate.

Having now described the invention, what I claim as new and desire to secure by Letters Patent, is:

1. An emergency vent valve device for railway vehicles of a train having a brake pipe normally charged with fluid pressure at a certain degree and effective upon reduction of fluid pressure therein for initiating a brake application on the train, said vent valve device comprising:

a. a casing;
   b. a vent valve member for controlling atmospheric communication between the brake pipe and atmosphere, said vent valve member normally occupying a closed position in which said communication is closed and being operable to an open position in which said communication is open;
   c. differential piston means subjected on one side to brake pipe pressure unrestrictedly and on an opposite side to said brake pipe pressure at a controlled rate via a rate-sensitive choke of preselected flow rate capacity, said differential piston means normally occupying, coincidentally with a balanced state of forces acting thereon, a neutral position in which said vent valve member is operated to its closed position, and being operable, in response to a reduction of pressure acting on said one side thereof at a rate exceeding the flow rate capacity of said rate-sensitive choke, to a vent position in which said vent valve member is operated to its said open position; and d. piston valve means operably engageable with said differential piston means and having at one end thereof a first pressure area subjected to the pressure acting on said opposite side of said differential piston means, and at the opposite end thereof a second pressure area subjected to a certain reference pressure normally of a lesser degree than the pressure acting on said first pressure area, e. said piston valve means normally occupying a cut-off position operably ineffective relative to said differential piston means, and being operable, in response to a reduction of pressure acting on said first pressure area to a degree less than said reference pressure, to an exhaust position in which said differential piston means is engaged and operated to its said vent position.

2. An emergency vent valve device, as set forth in claim 1, wherein said casing has formed therein:

a. a reference pressure chamber adjacent said second pressure area of said piston valve means and charged with said reference pressure;

b. a control pressure chamber between said second pressure area of said piston valve means and said opposite side of said differential piston means; and c. a brake pipe pressure chamber adjacent said one side of said differential piston means and connectable unrestrictedly to the brake pipe, d. said rate-sensitive choke being interposed between said control pressure chamber and said brake pipe pressure chamber, and said vent valve member being operably interposed between said brake pipe pressure chamber and an atmospheric passageway formed in the casing.

3. An emergency vent valve device, as set forth in claim 1, wherein said differential piston means comprises a pair of diaphragm type pistons forming an intermediate pressure chamber therebetween charged unrestrictedly with brake pipe pressure, and a piston stem on one end of which said diaphragm pistons are secured in axially spaced-apart relation, the other end of said piston stem making abutting contact with said vent valve member for effecting operation thereof.

4. An emergency vent valve device, as set forth in claim 3, further characterized by first biasing means acting through said vent valve member and said piston stem for urging said differential piston means toward its said neutral position, and second biasing means for urging said piston valve means toward its said cut-off position.

5. An emergency vent valve device, as set forth in claim 1, wherein said piston valve means comprises a piston valve and a valve stem extending axially from said first pressure area toward said differential piston means for making abutting contact therewith upon operation of said piston valve means to its said exhaust position, said valve stem being separable from said differential piston means.

6. An emergency vent valve device, as set forth in claim 5, further characterized by an exhaust communication, one portion of which is formed in said piston and a second portion of which is formed in the casing and opens to atmosphere, said one portion of said exhaust communication being cut off from the second portion in the cut-off position of the piston valve means and being placed in registry therewith in the exhaust position of the piston valve means for exhausting pressure in the reference chamber to atmosphere.

7. An emergency vent valve device, as set forth in claim 6, further characterized by a reset choke interposed in said second portion of said exhaust communication and of preselected flow capacity for delaying exhaust of said reference pressure from said reference chamber and consequently return of said differential piston means to its said neutral position for a corresponding time interval.

* * * * *